C. E. WHITE.
DISK HARROW.
APPLICATION FILED FEB. 20, 1911.
1,297,302.
Patented Mar. 11, 1919.
3 SHEETS—SHEET 2.
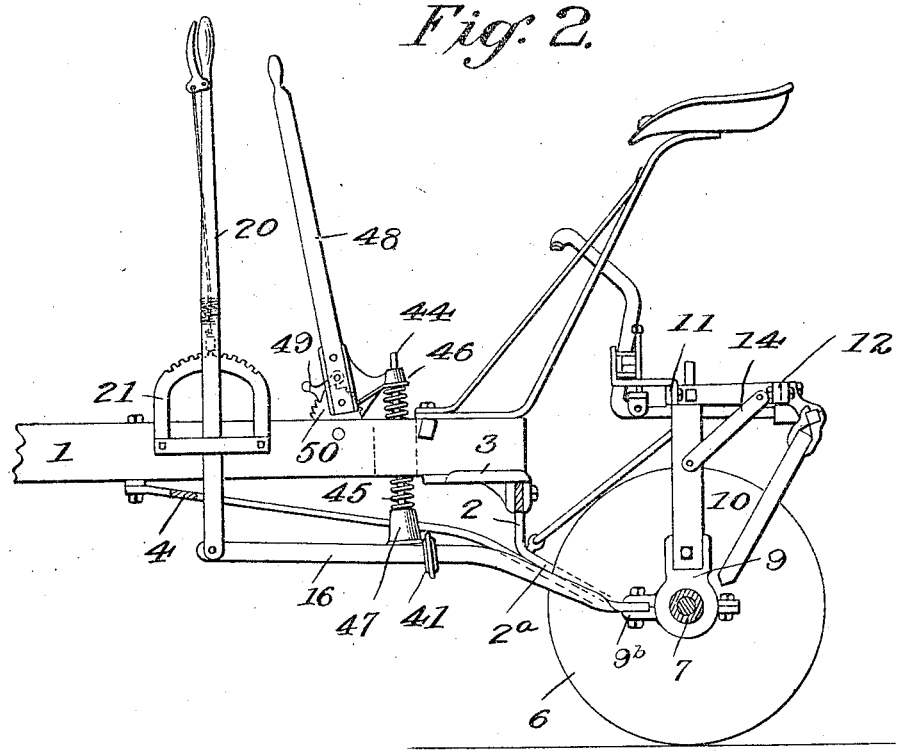
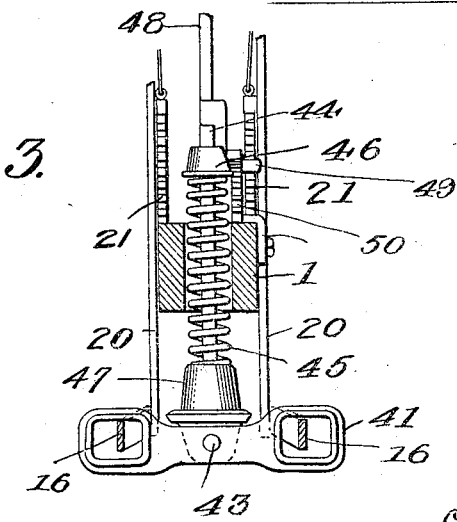
Witnesses
Jos. J. Collins
R. S. Gehr
Inventor
Charles E. White
By
H. H. Bliss
Attorney

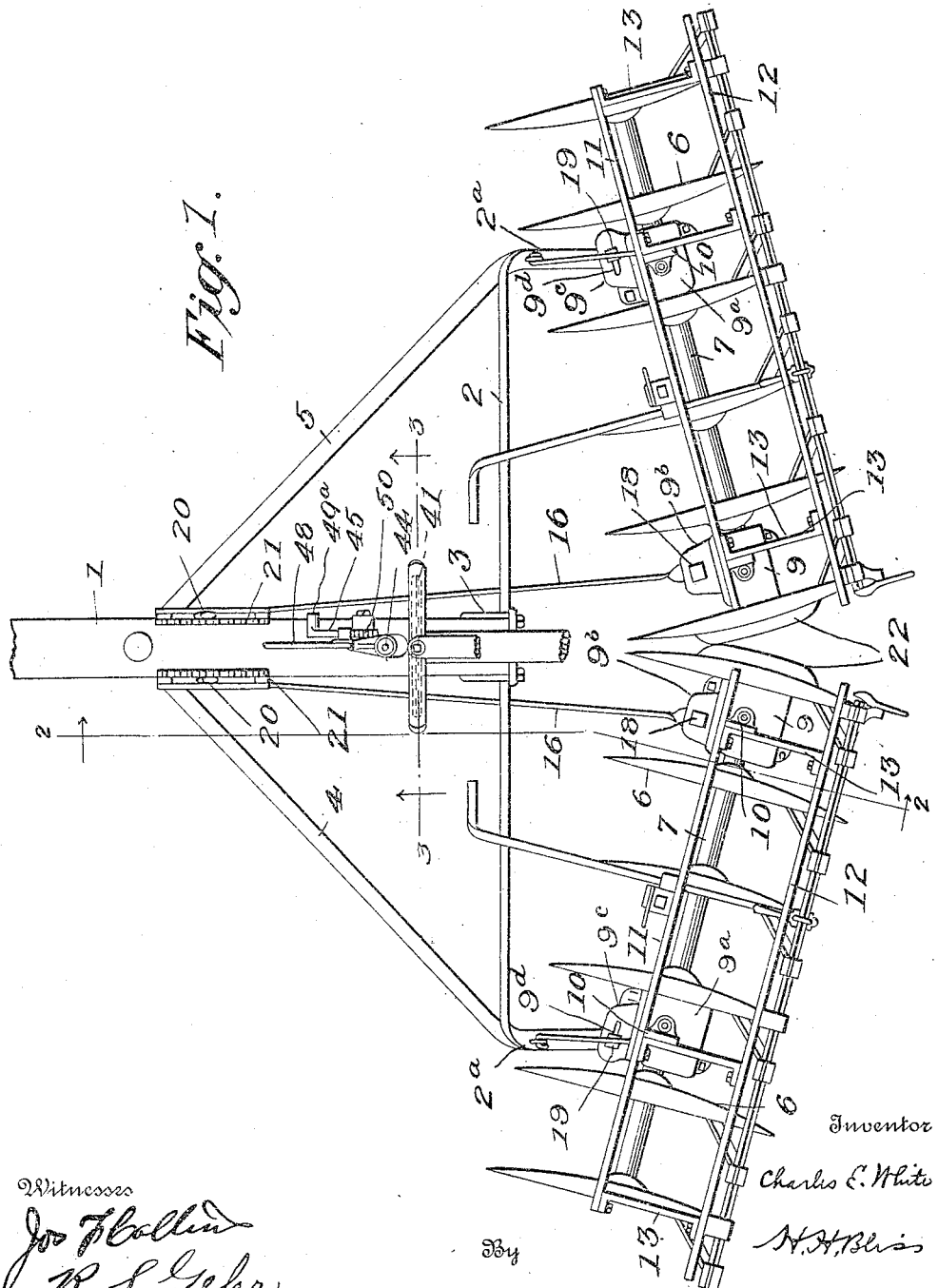

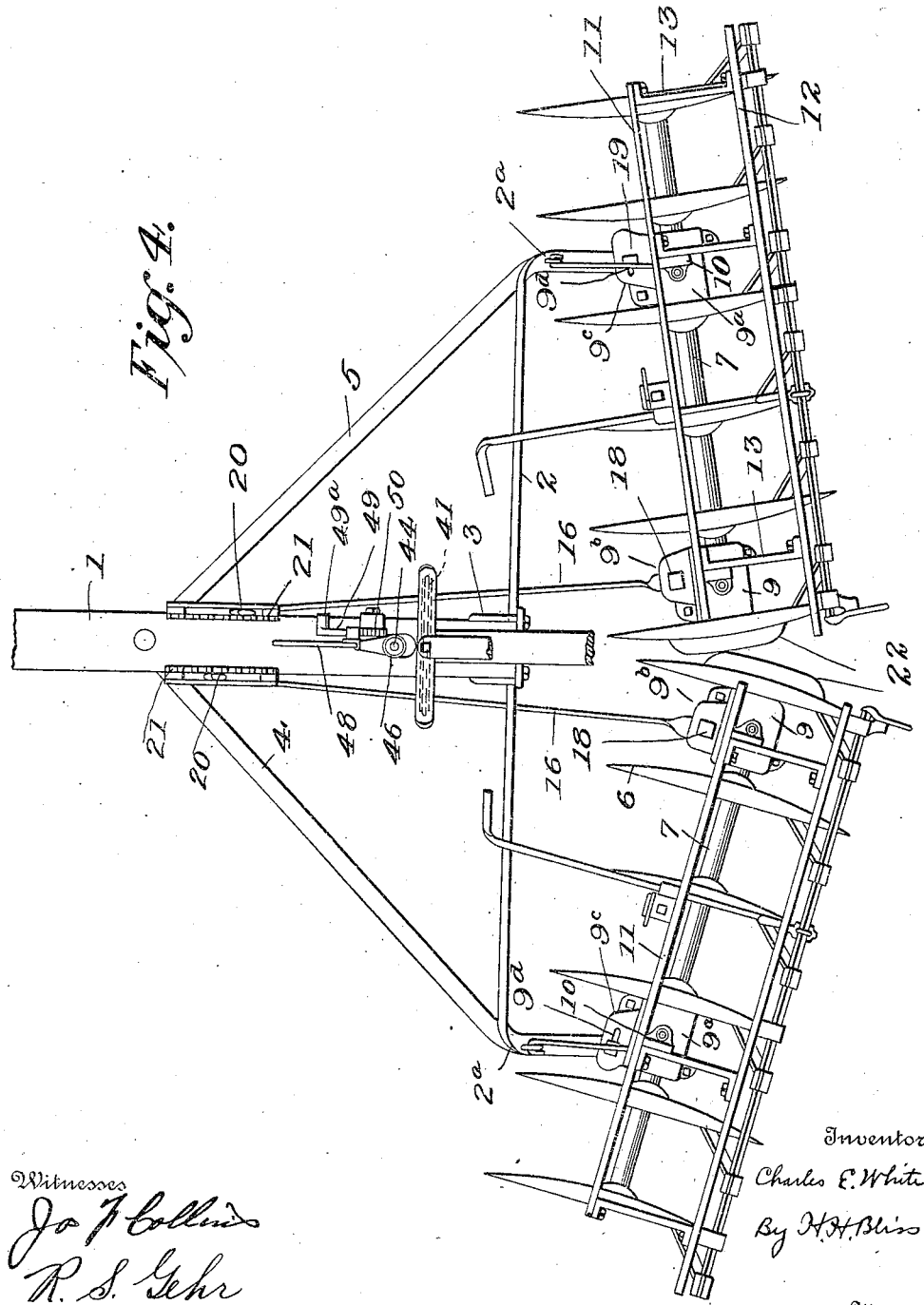

UNITED STATES PATENT OFFICE.

CHARLES E. WHITE, OF MOLINE, ILLINOIS, ASSIGNOR TO DEERE & COMPANY, OF MOLINE, ILLINOIS, A CORPORATION OF ILLINOIS.

DISK HARROW.

1,297,302.  Specification of Letters Patent.  Patented Mar. 11, 1919.

Application filed February 20, 1911. Serial No. 609,713.

*To all whom it may concern:*

Be it known that I, CHARLES E. WHITE, a citizen of the United States, residing at Moline, in the county of Rock Island and State of Illinois, have invented certain new and useful Improvements in Disk Harrows, of which the following is a specification, reference being had therein to the accompanying drawing.

This invention relates to improvements in disk harrows of the class including those in which each implement is provided with two oppositely disposed gangs or disks and a frame to which they are attached, and having a pole or draft device by which the structure can be propelled.

Figure 1, is a top plan view of a disk harrow embodying my improvements.

Fig. 2 is a vertical sectional view taken along the line 2—2 of Fig. 1.

Fig. 3 is a transverse sectional view taken along the line 3—3 of Fig. 1.

Fig. 4, is a plan view showing the parts illustrated in Fig. 1, but with the disks illustrated in different positions.

In the drawings, 1 indicates a tongue or pole, 2 a cross bar, secured to the rear end thereof and having outwardly turning end parts or arms for connection with the gang bearings. This cross bar is preferably secured by a bracket 3, which is fastened to the rear end, and to the bottom of the tongue, and is so shaped as to receive and be firmly bolted to the bar 2. 4, 5 are brace bars secured at their front ends to the pole and diverging outward to the angle parts of the cross bar 2, and connected thereto. 6, 6 indicate the harrow disks. There are two gangs shown and two sets of disks, one for each gang. As concerns the details of construction, these disk gangs may be made in any of several ways. As shown, each set of disks is mounted upon an axle, and they are spaced apart by sleeves or thimbles 7, 7. At the inner ends of the gangs there are bearing boxes 9, 9, and at points nearer the outer ends of the gangs there are additional bearings, represented by $9^a$.

Above each gang there is a framework having downwardly extending arms or standards 10, which, at their lower ends, are bolted in sockets cast with the bearings. The upper frame comprises transverse bars 11 and 12, with short longitudinal bars 13.

This framework supports the scrapers, the rock shaft for the scrapers, the lever devices by which the scrapers can be adjusted to different positions, the lock for the scrapers and their lever, and other adjuncts; but inasmuch as these do not constitute any part of the improvements herein claimed, and are fully illustrated and described in my application No. 476,068, filed February 4, 1909, it is not necessary to here set them out in detail.

16, 16 represent drag bars which connect the inner ends of the disk gangs to the pole. They are pivoted at 18 to the inner bearings 9, there being ears at $9^b$ to secure the pivots. These drag bars are at their front ends connected to the hand adjusting levers 20, which are pivoted to the tongue and have combined with them detents or dogs and segments 21, and by shifting the hand levers 20 the operator is enabled to adjust the inner ends of the gangs forward and back, simultaneously or independently, as he sees fit.

The outer parts of the disk gangs are loosely connected to the pole or draft devices by means of slotted ears $9^c$ which are formed with the outer boxes $9^a$, $9^a$. The slots are shown at $9^d$ and extend approximately parallel to the axes of the disks. The rear extremities of the backward turned arms $2^a$ of the cross bar 2 are connected with these ears by means of pivots at 19 which are fitted in the slots.

The slots $9^d$ permit the gangs, as entireties, to move longitudinally outward and inward at the times when their inner ends are being drawn forward or allowed to move backward.

The pressure of the earth on the concave sides of the disks tends to force them inward. This frequently causes a great pressure at the inner ends of the gangs and in order to take this and relieve the disks therefrom I provide them with large bosses 22, on the inner convex sides of the innermost disks. These hubs or bosses are of a peculiar shape as illustrated. They are of relatively very large diameters and the surfaces are described with long radii, they, in these respects, differing widely from the hubs or bosses generally used at the inner ends of disk gangs, the latter being approximately spherical in outline and having surfaces described with short radii. The shape and relative positions of these innermost hubs or bosses have a distinct relationship with the slots at 9ᵈ in the ears of the outermost gang boxes. No matter what position of the gangs, as entireties, may be assumed, under the action of the drag bars 16 and the government of the slots 9ᵈ, these enlarged bosses are always in advantageous engagement with each other, they reciprocally taking the pressure from the gangs and relieving the pivoting devices in slots at 9ᵈ and those at 18. Not only is this true when the gangs are so positioned that their axles lie in the same horizontal plane, but it is also true when one of them drops, at its inner end, below the inner end of the other, and it is still true when one gang is set at an angle to a line of draft greater than the angle of the other.

The drag bars 16 pass through a yoke bar 41 provided with slots or elongated apertures to receive them. This yoke bar is connected by a pivot at 43 to a vertical rod 44, which passes upward and engages with a spring 45. This rod 44 has, for this spring an adjustable abutment 46 for the upper end of the spring and an abutment at 47 against which the spring bears at its lower end.

The upper abutment 46 can be moved up or down by a lever 47, which carries it, the abutment being in the form of a bracket secured to the lever and having an aperture through which the rod 44 passes.

By means of these devices the operator can impart pressure to the inner ends of the gang axles whereby they can be held down with greater or less force as desired. He can set and fasten the lever to maintain such pressure after reaching the desired point of adjustment.

As the yoke bar 41 is pivoted the drag bars 16 can rise or fall independently of each other, and, consequently, there is no interference from the spring with the desired action of the hubs or bosses 22 with each other, even though the gangs are subject to the pressure of spring 45.

A disk harrow embodying my improvements has advantages in use which have been attained in no other harrow of which I have knowledge. Thus when my improved harrow is used in hillside work, the lower gang can be set at a greater angle than the upper gang so that the end thrust of the former will be the greater and prevent the machine from working down the hill. And when the gangs are thus set, the hubs or bosses on their inner ends remain in proper operative engagement so that the inward thrust of each gang is absorbed by the reaction of the other and the bearings through which the gangs are connected to the draft frame are relieved entirely from end thrust. Again, when it is desired to do double disking by overlapping, one gang working in hard ground and the other working in loose ground, there is less resistance to the pressure of the disks endwise of the gangs in the loose ground than in the hard ground, and to operate successfully, one gang should be set at a greater angle than the other so as to equalize the end thrust of the two gangs. As already stated, that can be done without interfering with the coöperative action of the gang hubs or bosses.

But much more than this is accomplished by my improved construction, for by combining with the endwise movable gangs and the peculiarly formed hubs or bosses thereof, the devices which control the vertical movements of the inner ends of the gangs, permitting them to rise independently of each other as well as simultaneously against spring pressure, every working requirement as to vertical flexibility as well as angular adjustment of the gangs, is met without sacrificing in any degree the advantage of directly counteracting the end thrust of each gang by the similar thrust of the other gang and without transmitting any of the end thrust through bearings to the main frame. Thus the inner ends of the gangs can rise simultaneously against the spring pressure in riding over a boulder or the like, or one can rise independently of the other at its inner end in passing over such an obstruction, and this can be done when the gangs are set at different angles as well as when set at the same angle, and at all times the hubs or bosses on the inner ends of the gangs remain in proper working engagement with each other, each taking the end thrust of the other in the manner described.

The bumpers or abutments 22 are made of a conformation which is related to the axes of movement of the gangs. The gangs under all ordinary normal circumstances are set at, or approximately at, their rearmost angles, that is to say in position somewhat in rear of that shown in Fig. 1, the front edge parts of the disks at such times being close together. When so set, the terminals of the vertical diameters of the innermost disks are spaced apart a distance substantially the same as the distance at which each disk, along a gang, is spaced from its neighbors. Consequently uniformly distanced furrows or lines of earth turning result in using the machine. And when the gangs are in this position of rearmost angulation, the bumpers still, reciprocally, take the endwise thrust of the gangs, the front edge parts of the disks at the terminals of the horizontal diameters being very close together, but not in contact, the stoppage points of the adjusting levers being such that at no time is any thrust taken upon the disks themselves.

The gangs, as above remarked, can when circumstances demand, be set relatively forward from these rearmost positions of angulation. In Fig. 1 they are shown set similarly and somewhat forward from their rearmost positions. Or, one of them, as above described, can be set forward of the other as shown in Fig. 4.

When the bumpers are made in the way above described each has a central part 22ª the cross-sectional lines of which are approximately straight or curves on long radii. The outer parts are in section on curves of shorter radii. Looked at in end elevation (relative to the axis of the gangs) the outermost circles are of very long radii from the axis; the length of these radii (and the face area of the bumpers) being predetermined in relation to the extent of the extreme backward angulation of the gangs, and also, as aforesaid, in relation to the pivots and slots at 19, 9ᵈ.

The abutment bumpers having the qualities herein shown and described are materially different from those of the older sorts and above referred to which had their operative surfaces of a conformation such that they were approximately circular in section. The earlier ones required that both be held in an approximately fixed relationship as to the center point of their circles. Both were united to drag bars, separately, and these bars, in turn, were connected to a single common lever so that when one gang assumed a certain angle the companion gang had to assume an equal opposite angle. It was not practicable to adjust the gangs with these rounded bosses or bumpers independently of each other. For, as soon as they were an inch or so off from the center they would slip to relative positions such that one would climb or rise to a point above the other, or move to a point in front of or a point below it after which it would press or tend to press against the metal of the opposing disk. When one of these bumpers has slipped past its companion (that is, slipped so as to lie above or below, in front or in rear of it) it tends to remain in such position under the inward pressure from the soil against the disks and it is with difficulty that they are brought into proper relative positions. In the present construction this slipping of one bumper past the other is impossible, for in whatever positions the gangs are set relatively to each other one bumper has its contact points arranged to bear against a predetermined surface part of its companion, and the gangs cannot have their axes held out of the proper relative positions after they reach a section of soil surface which permits them to return to their intended positions.

The spring holder yields sufficiently to permit the inner end of one gang and its disks to rise and to operate, for a longer or shorter time, in a relatively elevated position, but even then its bumper is still prevented from slipping past the opposing one, and even though the gangs at such time are set at different angles. This automatic or self-adjusting possibility for the gangs is not incident to the machines that have unyielding holders above the drag bars for holding the gangs down, even where there are levers for adjusting the gangs to different angular positions.

The bumpers 22 are not projected to any material distance inside of the convex surfaces of the adjacent disk. They are relatively thin and their operative surfaces are close to the disk surfaces; said operative surfaces of the bumpers being of such shape predetermined in relation to the pivotal points at 19 that the inner disks, as aforesaid, are at the same distance from each other as they are respectively from their outer neighbor, and in all their positions of adjustment this distance is maintained closely. The gangs are in their rearmost positions during the greater part of their work.

The abutment bosses, having operative surfaces, the expanded central parts 22ª of which are approximately flat or flatly curved, readily permit the slippage of one on the other vertically while under the action of the spring actuated pressure devices, and also permit one to slip on the other when the inner end of a gang is to be adjusted forward or backward relatively to the other, the bosses being, during such times, in rolling, pressure-taking contact with each other. As their central parts are thus approximately flat or only slightly curved, the bosses when measured on axial lines, do not protrude axially in such way as to become stops or obstructions to impede movement, readily, on vertical lines, or lines transverse to the axes of the gangs, either vertically or horizontally.

It is desirable to have the inner ends of the gangs in a balanced position as concerns vertical movements, that is to say, so held that they can float or rise and fall freely to conform to the surface of the soil. These disk implements are largely used for shallow plowing of land on which corn has been raised, to prepare it for oats. On the removal of the corn crop ridges or lines of elevation at the surface of the soil are left. Over large territories it is not desired to deeply plow this land or turn it with a moldboard plow. A disk implement working to a depth of three or four inches will adequately prepare the soil for some seeds, for example, oats.

The corn ridges if followed approximately in parallelism by the disk tool tend to throw the inner ends of the gangs up so that they will not travel in general parallelism with the surface. In the present machine the weight of the main frame and of the driver on the gangs is applied relatively near their outer ends. This tends to push the outer ends of the gangs down and lift the inner ends. And then the bosses being under pressure endwise tend by their friction and resistance to prevent the downward movement of the gang ends. I balance the upward lifting action or counteract it by means of the adjustable spring actuated pressure devices, which are always tending to slip the bosses downward and bring the gang axes to the level. And as the abutment bosses do not have long axially protruding parts, but are of the peculiar shape described (particularly, in the present respect, having the central parts of their operative surface approximately flat or formed with long radii) they are always free to readily and quickly slip down or up, upon each other, without interfering with the balance of the vertically acting forces, namely, the force from the spring devices pushing downward and the lifting tendency of the inner gang ends.

The spring actuated pressure devices are adjustable within the limits of vertical movements of the innermost end disks and the expanding, vertically, of the abutment bosses is related to those limits; the spring pressure devices, though permitting the rising and falling of the bosses while pressed tightly against each other, can be so set as to, practically, prevent either of the bosses from rising above a horizontal line predetermined relatively to the other, this being supplemental to any positive stopping action against rising movement of the bosses, provided by any parts carried by the main frame, as, for example, the bar 2.

And, similarly, the expanding in vertical planes of the bosses is predetermined in relation to the limits of their movements, at option, forward and backward within the limits of angulation of the gangs. Hence there is always assurance that no matter how widely, within working limits, the gang axes may diverge vertically or horizontally from each other in any direction, the bosses will not only freely slip to new extreme positions, but will always maintain rolling contact and hold the thin sheet steel disks separated from each other and prevent their pressing or wearing together.

Moreover, as each abutment boss has the edge 22$^c$ of its operative surface positioned close to the convex surface of its adjacent disk, it is impossible for the edge of the opposing boss, after assuming an eccentric position, to get caught between its companion and the disk, even if by any accident or extremely abnormal circumstances a gang should be sprung beyond its normal limit by the spring pressure or by the axially longitudinal pressure.

Preferably between the extreme edge at 22$^c$ and the approximately flat or flatly curved central pressure-taking area 22$^a$ there is a peripheral surface element 22$^b$ which is so shaped as to insure that near the very edge the rolling contact of the bosses will be preserved.

What I claim is:

1. In a disk harrow the combination of the draft frame, two opposed gangs of disks pressing inward in opposite directions, spring actuated pressure devices bearing upon the inner ends of the gangs and permitting them to rise and fall independently or simultaneously, connecting devices between the frames and the gangs which permit the latter to move freely longitudinally of their axes and permit their inner ends to vibrate vertically and also to be adjusted horizontally forward and backward, independently of each other, and relatively enlarged concavo-convex abutment bosses adapted to bear against each other when the gangs are under pressure longitudinally and vertically, each abutment being a boss which is radially widely expanded in vertical planes, with an operative surface the edge of which is positioned close to the convex surface of the innermost disk of its gang and the central part of which is relatively thin in axial directions and approximately flat, whereby said bosses can slip vertically under the action of the spring-actuated pressure devices, can slip horizontally while forced longitudinally together, and, while having rolling contact with each other at all times can hold the disks out of contact with each other during all shiftings of positions of the gangs within the working limits of the gang movements.

2. In a disk harrow, the combination of the draft frame, two opposed gangs of disks adapted to be pressed inward in opposite directions, spring-actuated pressure means bearing downward upon the inner ends of the gangs to prevent either from rising above horizontal lines predetermined relatively to the other gang, but permitting both gangs to yieldingly move vertically, two separable relatively enlarged abutment bosses normally bearing against each other when the gangs are under pressure vertically and longitudinally, each abutment being a boss which is widely expanded in vertical planes, and of a radial dimension related to the limits of the vertical, spring-controlled movements of the inner ends of the gangs, and connecting devices between the frames and the gangs which transmit draft to the gangs and permit them to move freely longitudinally of their axes and permit their inner ends to vibrate vertically and also to be adjusted horizontally forward and backward, independently of each other, the aforesaid abutment bosses being relatively flat and positioned close to the convex surfaces of the innermost disks of the gangs respectively, and being related in radial width dimensions to the limits of forward and backward adjustment of the gangs, whereby within the operative limits, vertically and longitudinally, of the gang movements, said bosses keep the innermost disks separated and maintain rolling contact under the pressure exerted on the gangs.

3. In a disk harrow, the combination of the draft frame, two opposed gangs of disks adapted to be pressed inward in opposite directions, spring actuated means exerting pressure downward on the inner ends of the gangs, two separable relatively enlarged bosses 22 each immediately inside of and adjacent the innermost disk of a gang and each having an operative surface with a wide, central, thin, approximately flat element 22$^a$, and a peripheral element 22$^b$ terminating at a circular edge 22$^c$ of long radius, which edge is positioned close to the convex surface of the adjacent disk, said surface elements 22$^a$ and 22$^b$ of each disk being each adapted to be pressed against and having rolling contact with any of the surface elements of the opposite boss and to slip from one position of contact to any of the other operative positions of contact within the working limits of angulation of the disks, and two independent manual levers for adjusting forward and backward the bosses and the inner ends of the gangs independently of each other while under longitudinal pressure, each of the said bosses being expanded from its axis radially to a distance related to any degree of angulation of the gangs resulting from the action of the spring or the actions of the levers.

In testimony whereof I affix my signature, in presence of two witnesses.

CHARLES E. WHITE.

Witnesses:
ROBERT M. ADAMS,
OSCAR F. LUNDAHL.

Copies of this patent may be obtained for five cents each, by addressing the "Commissioner of Patents, Washington, D. C."